(12) United States Patent
Hall

(10) Patent No.: US 9,463,898 B2
(45) Date of Patent: Oct. 11, 2016

(54) REUSABLE CONTAINER KIT

(75) Inventor: Russell G. Hall, Sylvania, OH (US)

(73) Assignee: Lamar & Associates, LLC, Toledo, OH (US)

( * ) Notice: Subject to any disclaimer, the term of this patent is extended or adjusted under 35 U.S.C. 154(b) by 1290 days.

(21) Appl. No.: 12/961,615

(22) Filed: Dec. 7, 2010

(65) Prior Publication Data

US 2011/0155729 A1 Jun. 30, 2011

Related U.S. Application Data

(60) Provisional application No. 61/290,261, filed on Dec. 28, 2009.

(51) Int. Cl.
| | |
|---|---|
| B65D 6/00 | (2006.01) |
| B65D 8/18 | (2006.01) |
| B65D 6/28 | (2006.01) |
| B65D 8/04 | (2006.01) |
| B65D 8/06 | (2006.01) |
| B65D 6/24 | (2006.01) |
| B65D 8/00 | (2006.01) |
| B65D 6/16 | (2006.01) |
| A01K 5/01 | (2006.01) |
| B65D 19/16 | (2006.01) |

(52) U.S. Cl.
CPC ..... *B65D 19/16* (2013.01); *B65D 2519/00029* (2013.01); *B65D 2519/00064* (2013.01); *B65D 2519/00099* (2013.01); *B65D 2519/00169* (2013.01); *B65D 2519/00203* (2013.01); *B65D 2519/00273* (2013.01); *B65D 2519/00288* (2013.01); *B65D 2519/00318* (2013.01); *B65D 2519/00343* (2013.01); *B65D 2519/00373* (2013.01); *B65D 2519/00497* (2013.01); *B65D 2519/00611* (2013.01); *B65D 2519/00641* (2013.01); *B65D 2519/00711* (2013.01); *B65D 2519/00985* (2013.01); *Y02W 30/807* (2015.05); *Y10T 29/49826* (2015.01)

(58) Field of Classification Search
CPC .... B65D 7/24; B65D 11/02; B65D 11/1873; B65D 2519/00273; A01K 5/0135
USPC ...... 220/4.28, 4.32, 4.33, 617, 621; 206/600
See application file for complete search history.

(56) References Cited

U.S. PATENT DOCUMENTS

| | | | | |
|---|---|---|---|---|
| 2,301,032 | A * | 11/1942 | Fielding | 220/495.11 |
| 3,374,915 | A * | 3/1968 | Verhein et al. | 220/4.28 |
| 5,050,793 | A * | 9/1991 | Graham, Jr. | 229/125.23 |
| 5,597,084 | A * | 1/1997 | Parasin | 220/4.28 |
| 5,967,356 | A * | 10/1999 | Laarhoven et al. | 220/6 |
| 6,966,449 | B2 * | 11/2005 | Williams | 220/4.31 |

* cited by examiner

*Primary Examiner* — Fenn Mathew
*Assistant Examiner* — Andrew T Kirsch
(74) *Attorney, Agent, or Firm* — Marshall & Melhorn, LLC

(57) ABSTRACT

Aspects of the invention include a reusable, collapsible container, which when in a disassembled state is completely contained in an area no larger than the base member thereof, is easy to assemble, and due to the interlocking features of a number of the component parts of the container, requires a minimal number of separate locking/fastening devices.

17 Claims, 12 Drawing Sheets

REUSABLE CONTAINER KIT

RELATED APPLICATION

This application is claiming the benefit, under 35 U.S.C. 119(e), of the provisional application filed Dec. 28, 2009 under 35 U.S.C. 111(b), which was granted Ser. No. 61/290,261. This provisional application is hereby incorporated by reference.

BACKGROUND

The invention relates to a collapsible reusable container. More specifically, the invention relates to a multi-component container, which when disassembled, forms an extremely compact self-contained "kit" which contains all of the components needed to construct a complete container which may be reused indefinitely.

The patent literature contains reference to many examples of containers which are said to be reusable, as well as examples of containers which are said to be collapsible. Many of these containers, upon further inspection, when disassembled, merely result in a collection of many loose components which may become separated, damaged or lost during return transport. The more truly "collapsible" such containers become, the more fragile, and less reusable, they tend to be.

It would, therefore, be desirable to have a container which is easy to assemble, forms a truly self-contained "kit" when disassembled, while at the same time being robust enough to withstand multiple cycles of transport.

SUMMARY OF THE INVENTION

The present invention relates to a reusable, collapsible container which, when in a disassembled state is completely contained in an area no larger than the base member thereof, is easy to assemble and due to the interlocking features of a number of the component parts of the container, requires a minimal number of separate locking/fastening devices.

The base member of the container of the present invention serves multiple functions. It functions as a relatively conventional base/pallet when the container is assembled, but serves, unconventionally, as the storage container for all of the remaining component parts of the container. Access openings in the base member preferably allow transport of the container in either the assembled or disassembled state by forklift, or other types of container transport equipment The interaction of various other components of the present container with the base member is an important aspect of the invention. More specifically, a first horizontal support member, having a plurality of locking tab receiving openings formed in the peripheral area thereof, is disposed in the base member, the first horizontal support member having a shape, generally, corresponding to the shape of the base member. The base member may have any predetermined geometric shape, but is preferably square or rectangular.

Locking tabs are formed in the bottom peripheral portions of vertical wall members in predetermined positions, so as to align with the locking tab receiving openings in the first horizontal support member. The locking tabs of one or more of the vertical wall members are lockingly inserted into the locking tab receiving openings of the first horizontal support member and are thus preferably interlocked for each individual vertical wall member, but are not integrally interlocked as an overall structure.

Such overall, or integral interlocking of one or more of the vertical wall members may be accomplished by placement of the second horizontal support member over the first horizontal support member, and peripherally lockingly contacting one or more of the vertical wall members. Greatly enhanced structural rigidity of the structure of the container results therefrom. "Front-end" loading of the present container is possible in one configuration of the container.

The vertical wall members also have locking device receiving openings formed therein, as does a top member. Locking devices, preferably locking clips are configured so as to fit into locking device receiving openings in adjacent container members, for example the top member and vertical wall member, or two adjacent vertical wall members. Due to the enhanced container rigidity created by the utilization of the locking tabs and the second horizontal support member, the number of locking devices necessary to meet container integrity requirements is minimized.

Methods of assembling the container of the invention are also provided.

BRIEF DESCRIPTION OF THE DRAWINGS

Additional objects, advantages and features of the present invention will become apparent from the following description and appended claims taken in conjunction with the accompany drawings in which:

DETAILED DESCRIPTION OF THE INVENTION

Figure 1:
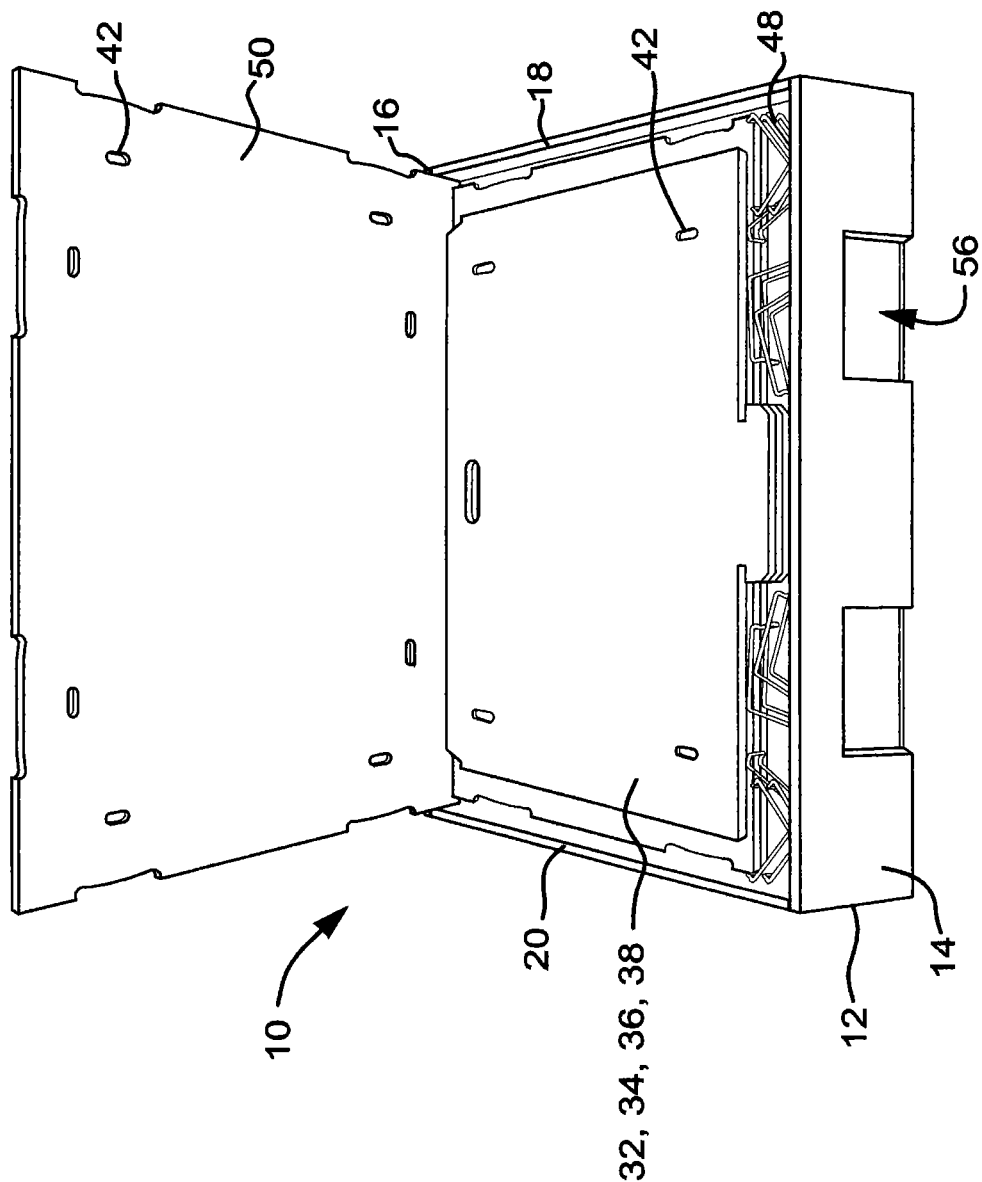
FIG. 1 is a perspective view of the container according to the invention in a disassembled state.

The present invention relates to a compactly storable, easily assembled, reusable container for transporting many different types of cargo.

While the container can be made from any suitable material, apart from certain base reinforcing members, which are preferably made from wood, and locking devices which are preferably made from metal, most of the other components of the container are preferably made from wood composite materials, such as oriented strand board (OSB).

Applicants note at the outset, that while the container of the present invention is formed from a number of components, it is more than just a collection of components in the novel manner in which the components interact when assembled and in the manner in which they neatly and logically self-store when disassembled.

The multi-functional base member 12 of the reusable container 10 is made up of a plurality of base reinforcing members 22 to which are mechanically fastened, by any suitable fastening device, parallel front and rear vertical base members 14, 16 which are separated by a distance substantially equal to the length of parallel first and second vertical side base members 18, 20. First and second vertical side base members 18, 20 are substantially perpendicular to front and rear vertical base members 14, 16, and when mechanically fastened to one another, form the substantially square or rectangular periphery of base member 12. (See FIG. 1.) Within the boundary of the peripheral area formed by vertical base members 14, 16, 18, 20, a horizontal sub-base member 24 is mechanically fastened to one or more base reinforcing members 22. (See FIG. 2).

Over the horizontal sub-base member 24, a first horizontal support member 26, having a shape substantially corresponding to that formed by vertical base members 14, 16, 18, 20, is disposed. In the peripheral area of the first horizontal support member 26, a plurality of locking tab receiving openings 30, 130 are formed. (See FIG. 3.) Locking tab receiving openings are substantially T-shaped and rectangular, respectively, however, other shapes are possible. It is also possible, and in some configurations, preferred, that locking tab receiving openings 30, 130 having more than one shape may be formed in a single first horizontal support member 26. Preferably the vertical base members 14, 16, 18, 20 have a predetermined height so as to extend a predetermined distance above the first horizontal support member 26, thus forming a retaining lip, which as will be seen serves a variety of functions.

Other components of the present container include at least one vertical wall member. Preferably, the container is provided with front and rear vertical wall members 32, 34 and first and second side vertical wall members 36, 38. Each of the vertical wall members has at least one locking tab 40, 140 formed in a bottom peripheral portion of vertical wall members 32, 34, 36, 38. (See FIGS. 4 and 8). The locking tabs 40, 140 may vary in shape between one vertical wall member and another. Preferably, the shapes of the locking tabs 40, 140 are substantially T-shaped or rectangular shaped to correspond to the shapes of the locking tab receiving openings 30, 130 formed in the first horizontal support member 26.

Figure 6:
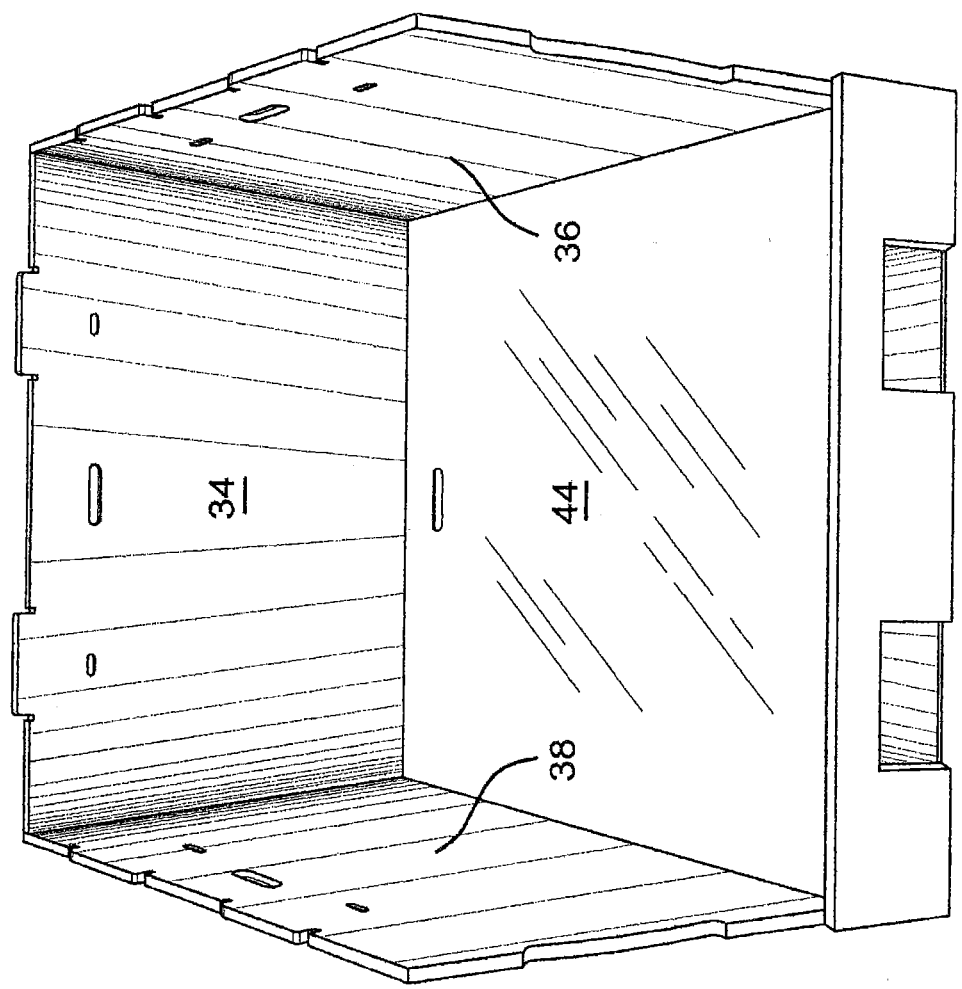
FIG. 6 is a perspective view of the substantially assembled container according to the invention, showing the second horizontal support member integrally locking in the vertical wall members.

Still another component of the present container is second horizontal support member 44 which is disposed over the first horizontal support member 26. (See FIG. 6.) Besides providing the capability of transporting heavier cargoes, the peripheral area of the second horizontal support member 44 contacts one or more of the bottom peripheral portions of vertical wall members 32, 34, 36, 38. If the locking tab 40, 140 of the vertical wall member 32, 34, 36 or 38 has been inserted into locking tab receiving openings 30, 130 prior to disposal of second horizontal support member 44 over the first horizontal support member 26, the peripheral edge of second horizontal support member 44, preferably integrally locks all such vertical wall members 32, 34, 36 or 38 into a finally assembled state. (See FIG. 6.) It may be desirable, however, to provide an option for front-loading of the container 10 by allowing for installation of one or more vertical wall members, preferably front and/or rear vertical wall members 32, 34 after the second horizontal support member 44 has been disposed in the container, and has integrally interlocked those previously installed vertical wall members into place, as earlier described herein. (See FIGS. 7-9). To facilitate the front-loading option, it may be desirable for the peripheral dimensions of second horizontal support member 44 to be smaller, by a predetermined amount, in comparison to the peripheral dimensions of the first horizontal support member 26, so as to allow engagement of locking tabs 40, 140, into locking tab receiving openings 30, 130 even though second horizontal support member 44 is already in place.

Once vertical wall members 32, 34, 36, 38 are installed as previously described, a top member 50 is brought into closing contact with upper peripheral portions of vertical wall members 32, 34, 36, 38. Preferably, top member 50 (See FIG. 1) is better secured and accurately located with respect to vertical wall members 32, 34, 36, 38 by top locating tabs 52 and top locating notches 54 formed in top member 50, and in the upper peripheral portions of vertical wall members 32, 34, 36, 38.

Even though all of the previously described components of the reusable container 10 are interlocked with one or more other adjacent components, it will in most instances, be desirable to further increase the structural integrity of the container 10. This is accomplished by utilization of a plurality of locking devices 48, having first and second ends. Typically, such locking devices are substantially L-shaped and are made from a metal having certain spring-like qualities. Preferably, each of vertical wall members 32, 34, 36, and 38, and top member 50 are provided with a plurality of locking device receiving openings 42 in the near-peripheral area of each of the aforementioned components of container 10. By inserting the first end of a locking device 48 into a locking device receiving opening 42 in, for example, front vertical wall member 32, and the second end of the locking device 48 into a locking device receiving opening in, for example, first side vertical wall member 36, these two components are positively interlocked. This process is repeated as necessary to ensure interlocking of component of container 10 as deemed necessary. Due to the interlocking of the components provided in the inventive container apart from the locking devices 48, the number of locking devices needed may be only 50% of the number needed in conventional containers, for example, 50% of 24-32 locking devices.

With this overview, the container of the invention will now be described in more detail with reference to the figures which are a part of this application.

Figure 2:
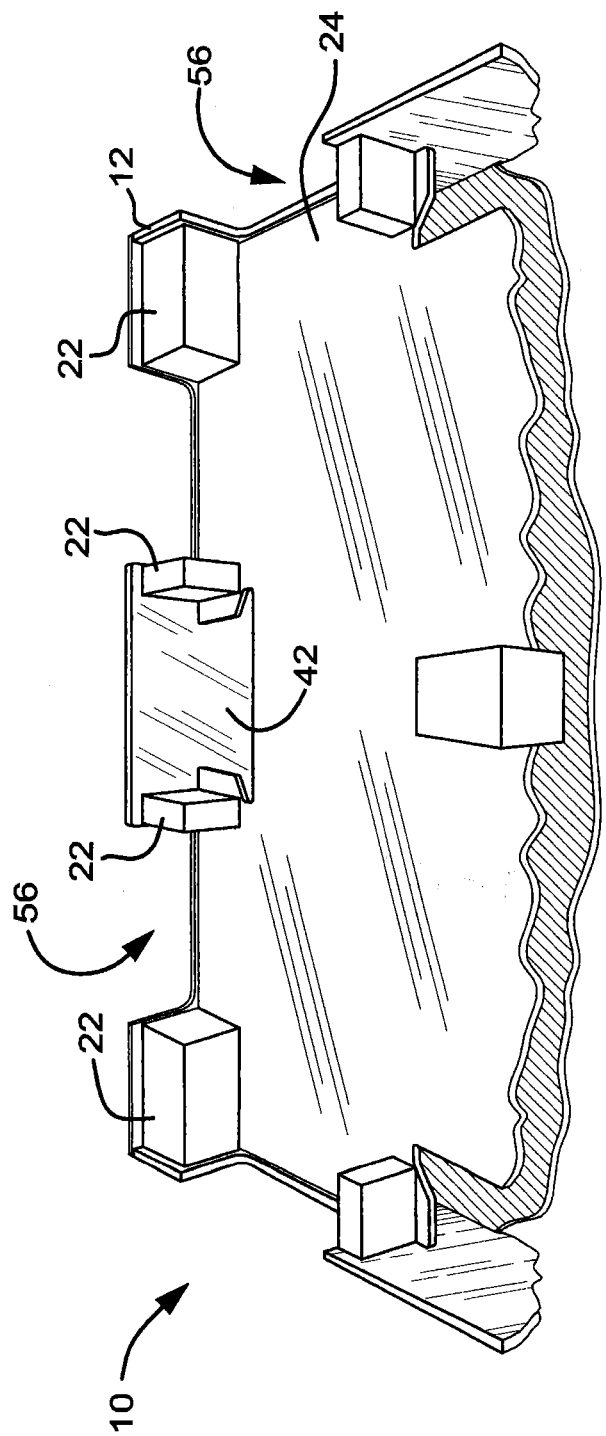
FIG. 2 is a perspective view of typical base reinforcing members and a portion of the horizontal sub-base member of the container according to the invention.
Figure 11:
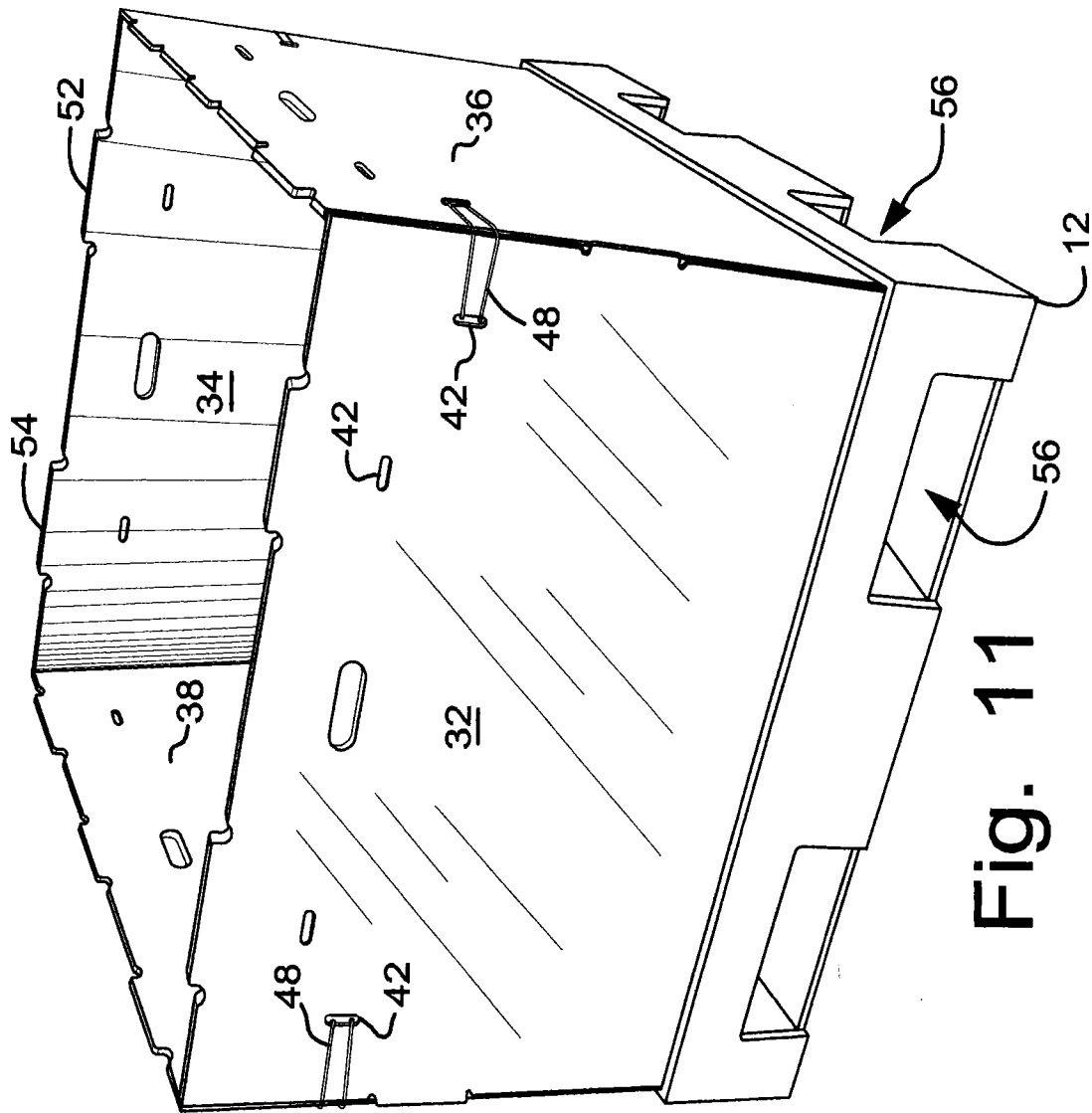
FIG. 11 is a perspective view of a substantially assembled container (minus the top member) also showing several locking devices inserted into locking device receiving openings, according to the invention.
Figure 12:
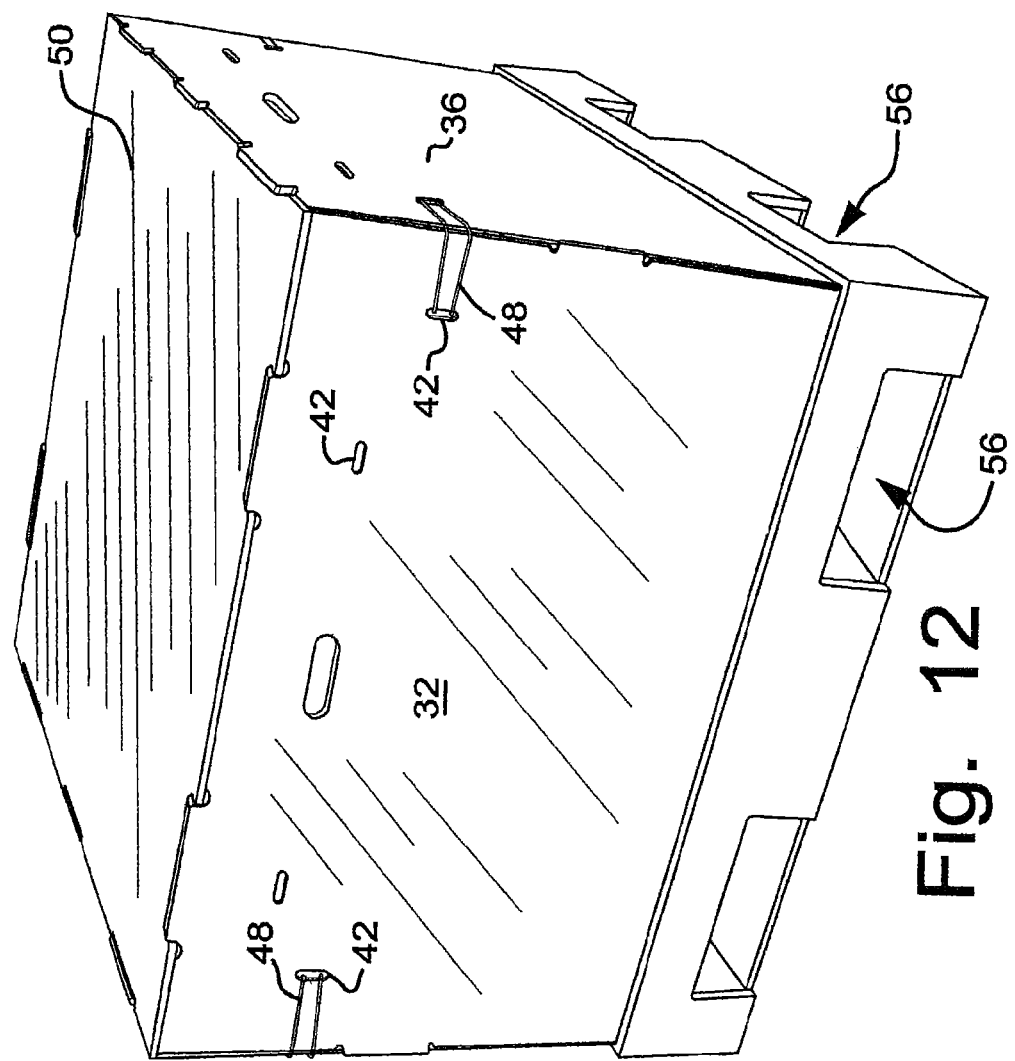
FIG. 12 is a perspective view of a completely assembled container, according to the invention.

As can be seen in, for example FIGS. 1 and 11, at least one lifting device access opening 56 is formed in one or more of vertical base members 32, 34, 36, 38 to allow access to, for example, the forks of a forklift truck for transporting container 10, whether in an assembled or a disassembled state.

Figure 3:
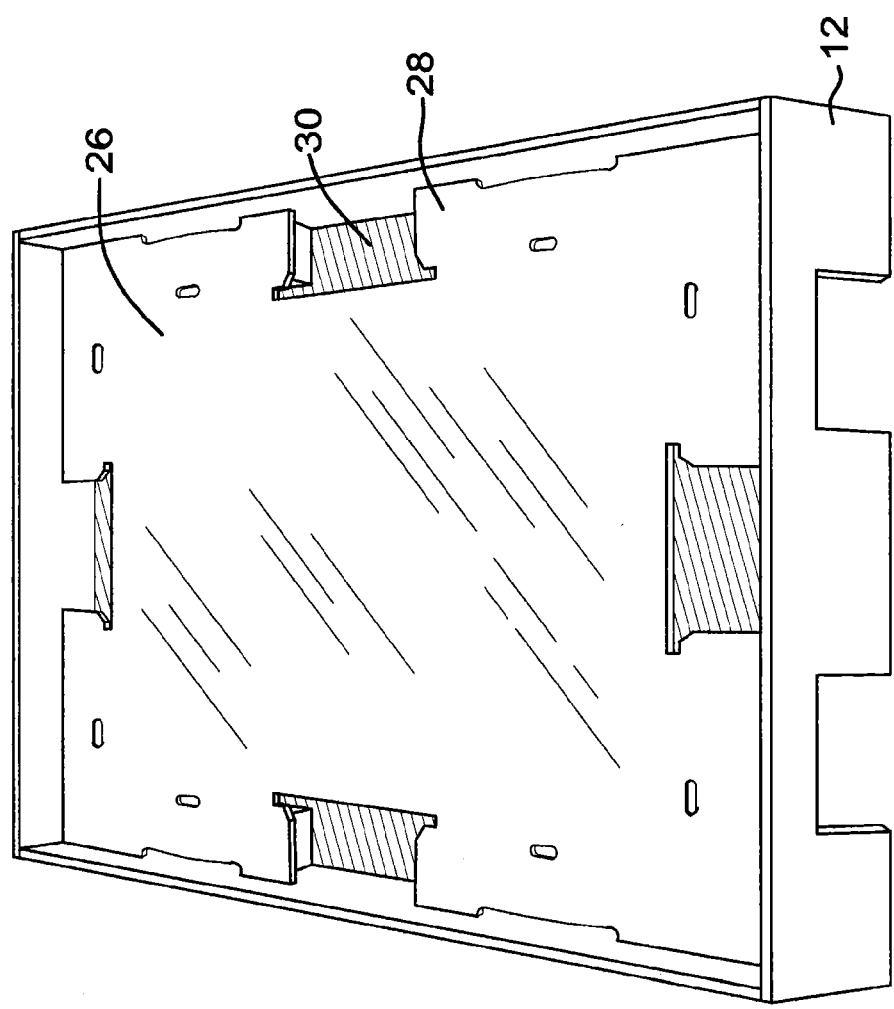
FIG. 3 is a perspective view of the first horizontal support member having T-shaped locking tab receiving openings inserted into the base member of the container according to the invention.

As best seen in FIG. 3, substantially T-shaped locking tab receiving openings 42 are formed in the peripheral area of first horizontal support member 26 which is disposed within base member 12.

Figure 9:
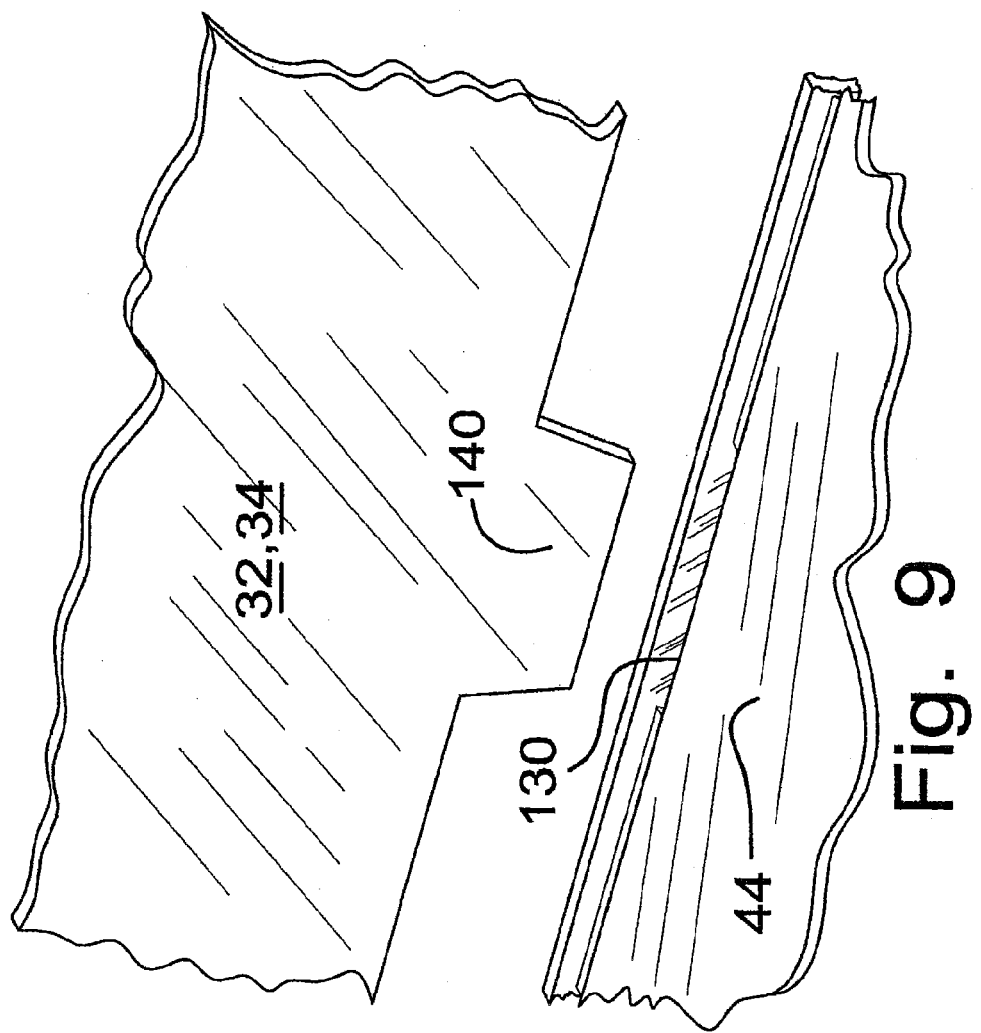
FIG. 9 is a similar view to FIG. 4 of a vertical wall member having the alternative shape locking tab formed in a bottom peripheral portion thereof so as to be lockingly insertable into a correspondingly shaped locking tab receiving opening formed in the first horizontal support member, but accessible when the second horizontal support member of the container of the invention is already disposed in the base member.

Alternatively, as shown in FIG. 9, substantially rectangularly shaped locking tab receiving openings 130 may be formed in first horizontal support member 26. While other reasons for utilizing the alternatively shaped locking tab receiving openings 130 are possible, it is envisioned that they will be utilized primarily in containers 10 which have a front loading option.

Figure 4:
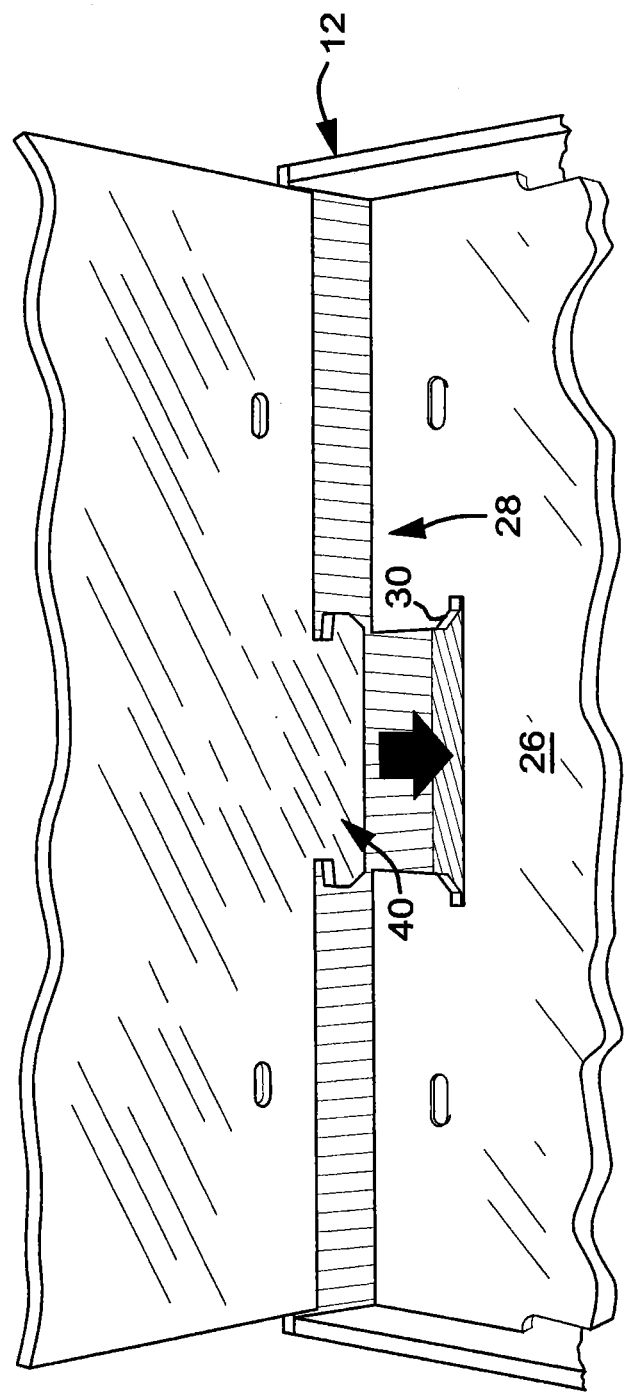
FIG. 4 is a perspective view of a vertical wall member having a T-shaped locking tab formed in a bottom peripheral portion thereof so as to be lockingly insertable into the correspondingly shaped locking tab receiving opening formed in the first horizontal support member of the container according to the invention.
Figure 5:
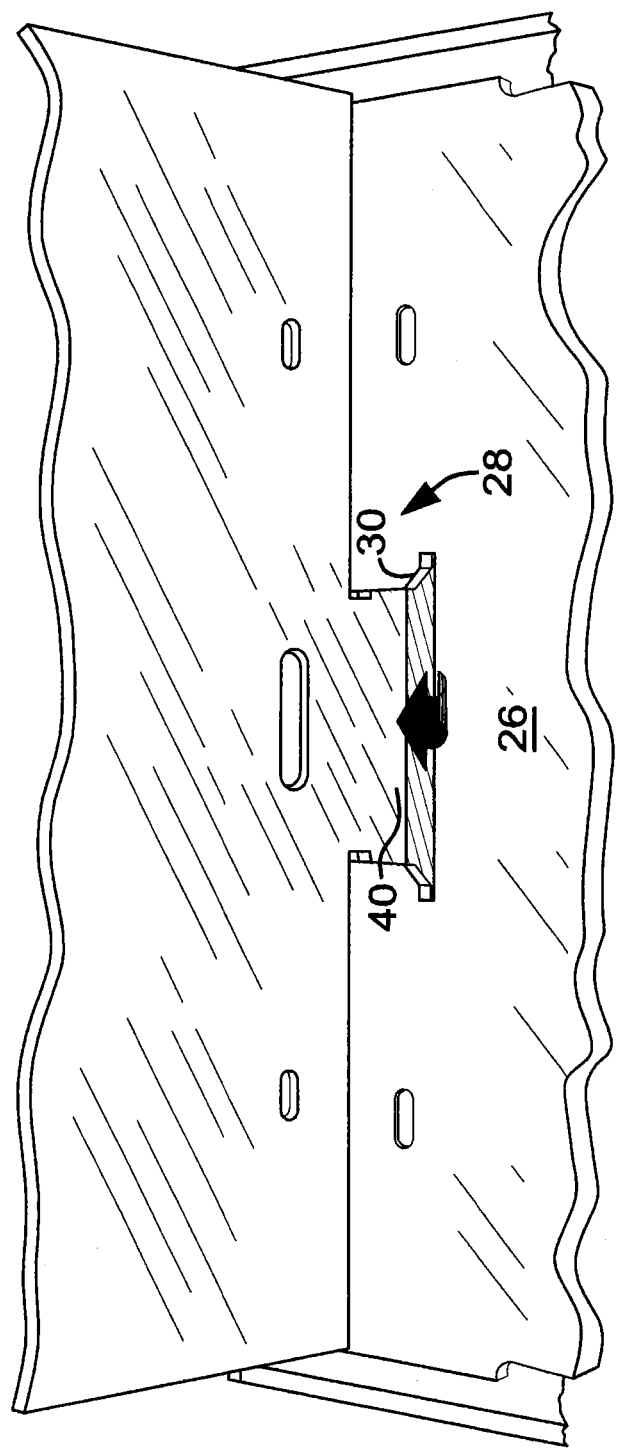
FIG. 5 is a perspective view of a T-shaped locking tab lockingly engaged in a locking tab receiving opening in the first horizontal support member of the container according to the invention.

With reference to FIG. 4 a substantially T-shaped locking tab 40 is provided in the lower peripheral portion of any of vertical wall members 32, 34, 36, 38. By referring to FIGS. 4 and 5 the interlocking action of locking tab 40 into locking tab receiving opening 30 is illustrated. Locking tab 40 is preferably inserted into locking tab receiving opening 30 at its widest point and moved laterally so that the top of the "T" of locking tab 40 is lockingly retained under the surface of first horizontal support surface 26.

Figure 7:
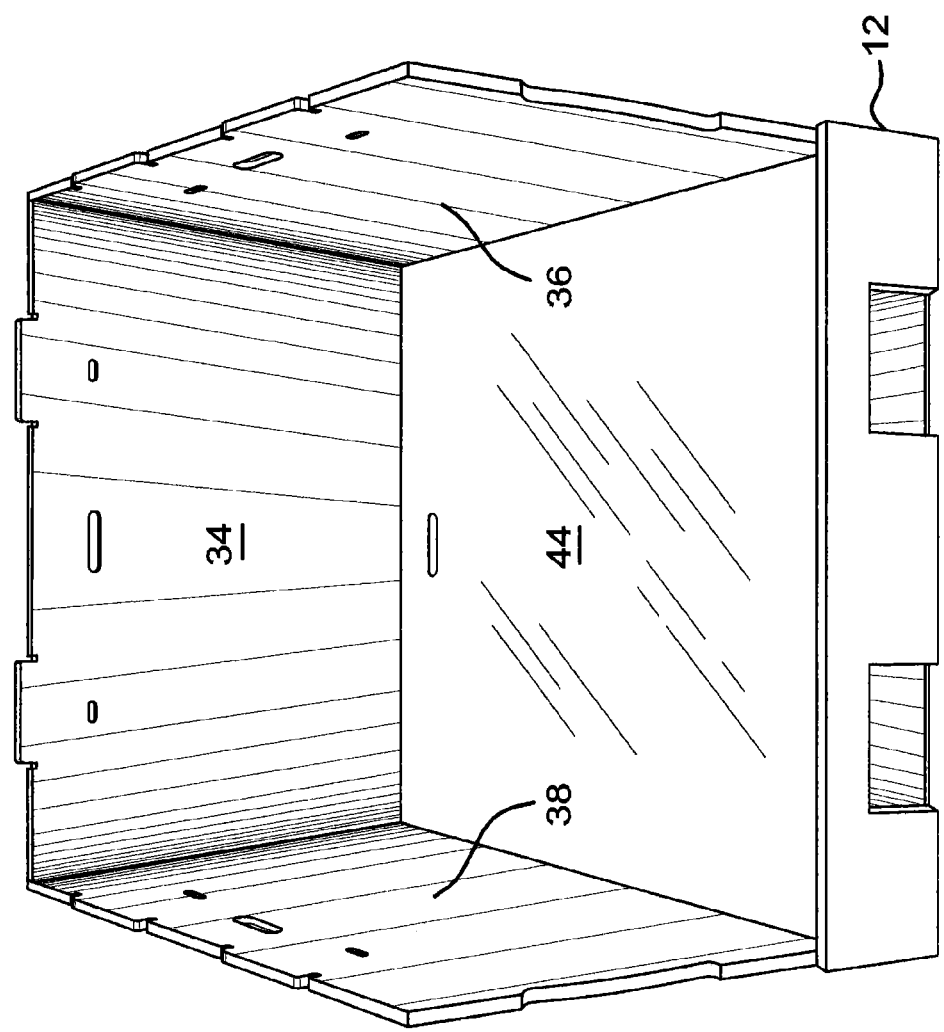
FIG. 7 is a perspective view of the container according to the invention having a front end loading option.
Figure 8:
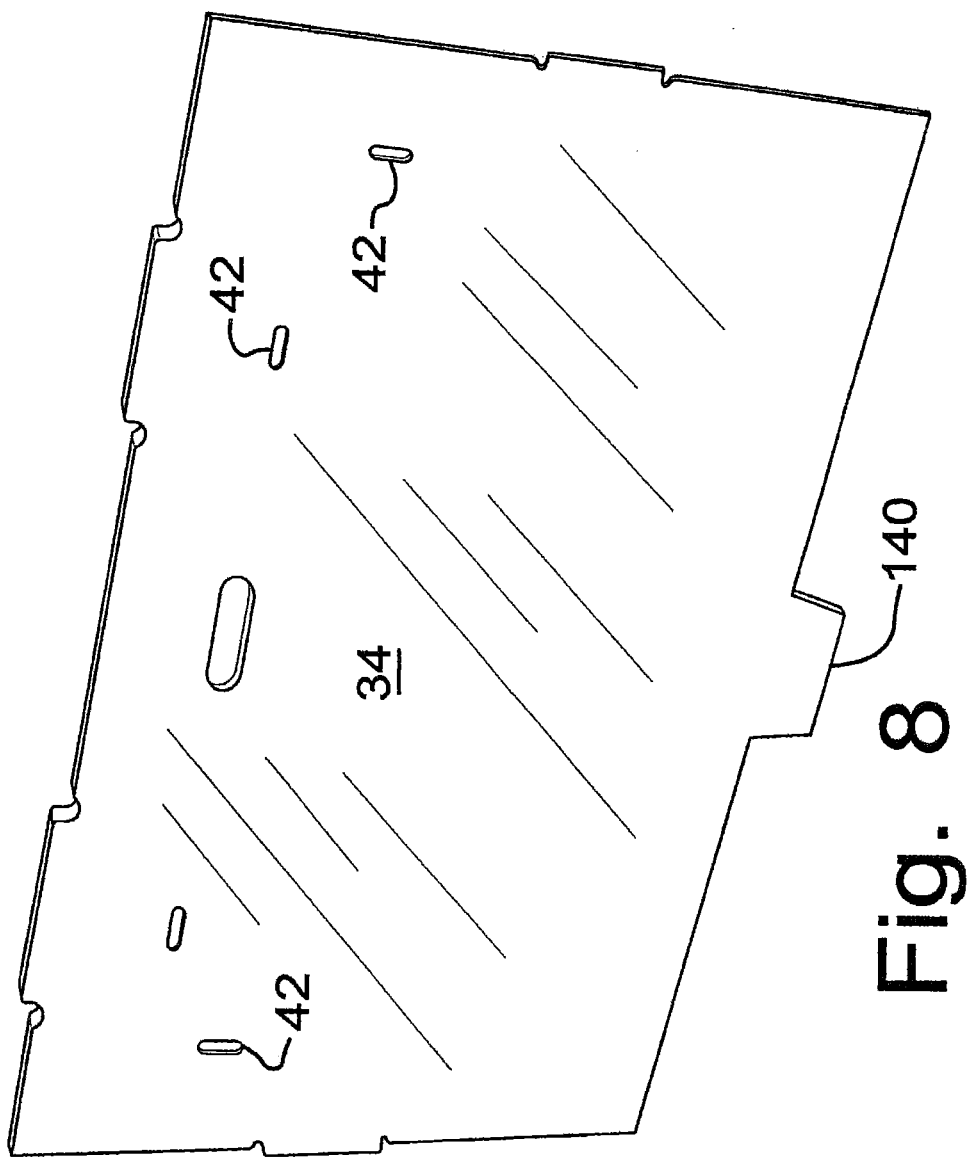
FIG. 8 is a perspective view of a vertical wall member having an alternative locking tab shape usable with the front end loading option of the container according to the invention.
Figure 10:
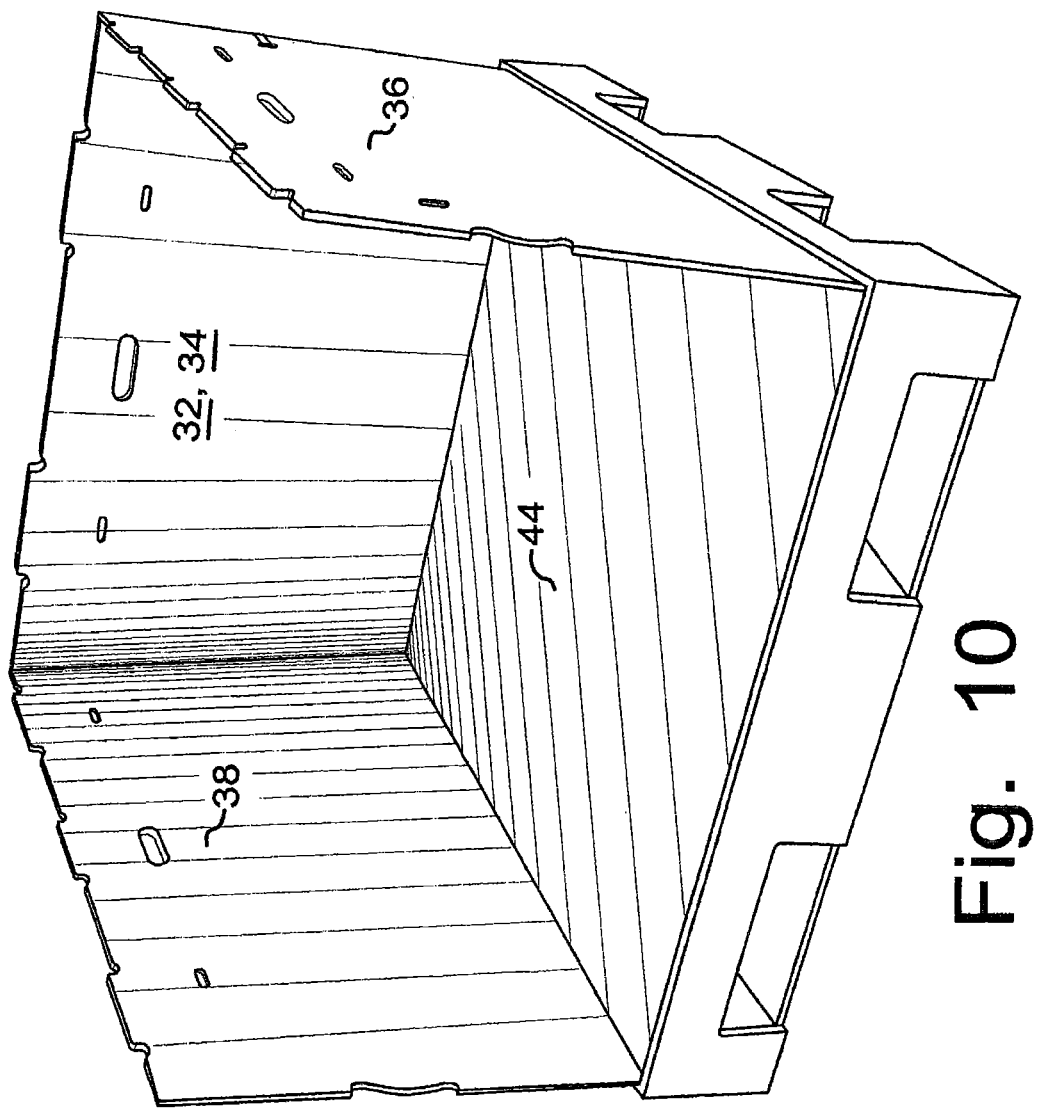
FIG. 10 is a similar view to FIG. 7 of the container according to the invention, the container shown having the front end opening option such that at least the front vertical wall member is not integrally locked into place by the second horizontal support member.

Alternatively, as best seen in FIGS. 8-10, a substantially rectangularly shaped locking tab 140 is formed in the bottom peripheral portion of any of vertical wall members 32, 34, 36, 38, and is capable of being inserted into correspondingly shaped locking tab receiving opening 130 with second horizontal support member 44 in place. As previously mentioned such an arrangement may be utilized to facilitate a front loading option for reusable container 10, illustrated in, for example, FIG. 7.

As can be seen in, for example FIGS. 1, 7, and 11, substantially alternating locating tabs 52 and locating notches 54 are formed in top member 50, and any one of vertical wall members 32, 34, 36, 38.

As shown in FIG. 1, a plurality of a preferred form of locking device 48 is stored in base member 12 of reusable container 10. In FIG. 11, such preferred locking devices, i.e., formed from heavy gauge metal wire having spring-like properties, are lockingly inserted into locking device receiving openings 42 thus securing, for example, vertical wall members 32, 34, 36, 38 one to another, or top member 50 to vertical wall members 32, 34, 36, 38.

While FIGS. 2-11 illustrate various configurations of the reusable container 10, in various stages of assembly, FIG. 1 illustrates an important aspect of the container of the invention, namely, the compact size and well organized storage of the components thereof when disassembled. As shown in FIG. 1, base member 12 as delineated by vertical base members 14, 16, 18, 20, contain within the "footprint" of the base member 12 all of the previously described components of reusable container 10, including first and second horizontal support members 26 and 44, vertical wall members 32, 34, 36, 38, top member 50, and a plurality of locking devices 48. These components are vertically contained by the predetermined height of vertical base members 14, 16, 18, 20.

The foregoing discussion discloses and describes exemplary embodiments of the present invention. One skilled in the art will readily recognize from this discussion and from the accompanying drawings and variations can be made therein without departing from the spirit and scope of the invention as defined in the following claims.

What is claimed is:

1. A reusable container comprising:
 a base member comprising:
  a front, vertical base member;
  a rear vertical base member separated from, and substantially parallel to the front vertical base member;
  the front and rear vertical base members separated by a distance substantially equivalent to the length of first and second vertical side base members;
  the first and second vertical side base members being substantially parallel to each other, being substantially perpendicular to the front and rear vertical base members and being mechanically fastened to the front and rear vertical base members;
  a plurality of base reinforcing members mechanically fastened to each of the front, rear, first and second vertical base members;
  a horizontal sub-base member mechanically attached to the base reinforcing members;
  a first horizontal support member having a peripheral area thereabout fitting within the area formed by the joined front, rear first and second vertical side base members;
 wherein the vertical base members extend a predetermined height above the horizontal support member and having a plurality of locking tab receiving openings formed in the peripheral area of the first horizontal support member;
  a front, a rear, and first side and second side vertical wall members, each vertical wall member having a peripheral area thereabout;
  one or more locking tabs formed in a bottom portion of the peripheral area of each of the front, rear, and first and second vertical wall members; oriented so as to be insertable into the locking tab receiving openings in the first horizontal support surface of the horizontal receiving member;
  one or more locking device receiving openings also being formed in predetermined locations in each of the vertical wall members;
  a second horizontal support member having a peripheral area thereabout, disposed over the first horizontal support surface, the peripheral area thereof lockingly contacting the one or more locking tabs of one or more of the vertical wall members;
  a top member having a peripheral area thereabout and a plurality of locking device receiving openings formed therein, capable of closing the container when substantially perpendicularly oriented to the vertical wall members and in closing contact with a top portion of the peripheral area of each of the vertical wall members; and
  a plurality of locking devices capable of securing the vertical wall members one to another and securing the top member to one or more of the vertical wall members; wherein in a disassembled state, the first horizontal support surface, the second horizontal support surface, the front, rear and first and second side vertical wall members, the top member and the plurality of locking devices are all contained within the area defined by the front, rear and first and second vertical side base members and to a height no greater than the predetermined height of the front, rear and first and second vertical side base members.

2. The reusable container defined in claim 1, wherein at least one lifting device access opening is formed in one or more of the front, rear and first and second side vertical base members.

3. The reusable container defined in claim 1, wherein the locking tab receiving openings formed in the peripheral area of the first horizontal support member are substantially T-shaped.

4. The reusable container defined in claim 1, wherein one or more of the locking tab receiving openings formed in the peripheral area of the first horizontal support surface are substantially rectangular in shape.

5. The reusable container defined in claim 1, wherein the locking tabs formed in the bottom portion of the peripheral area of each of the vertical wall members are substantially T-shaped.

6. The reusable container defined in claim 1, wherein one or more of the locking tabs formed in the bottom portion of the peripheral area of each of the vertical wall members are substantially rectangular in shape.

7. The reusable container defined in claim 1, wherein one or more locating tabs and one or more locating notches are formed in predetermined locations in the top portion of the peripheral area of each of the vertical wall members.

8. The reusable container defined in claim 7, where one or more locating tabs and one or more locating notches are formed in predetermined locations in the top member, so as to alternate with the one or more locating tabs and locating notches formed in the top portion of the peripheral area of one or more of the vertical wall members.

9. The reusable container defined in claim 1, wherein the locking devices are metal clips.

10. The reusable container defined in claim 9, wherein the metal clips are formed of a wire having spring-like properties.

11. A method of assembling a reusable container comprising:
   providing a base member comprising:
      front, rear and first and second side vertical base members mechanically fastened to one another to form a predetermined geometric shape, and having a predetermined height sufficient to contain complementarily shaped component parts therein; the component parts including:
      (i) a first horizontal support member having a peripheral area thereabout, a plurality of locking tab receiving openings being formed in the peripheral area of the first horizontal support surface,
      (ii) a front, a rear and first and second vertical wall members having a peripheral area thereabout, one or more locking tabs being formed in a bottom portion of the peripheral area of each of the front, rear and first and second vertical wall members, and having a plurality of locking device receiving openings formed in predetermined locations therein;
      (iii) a second horizontal support member having a peripheral area thereabout;
      (iv) a top member having a peripheral area thereabout, and having a plurality of locking device receiving openings formed in predetermined locations therein;
      (v) a plurality of locking devices having first and second ends capable of being inserted in the locking device receiving openings in the top member and vertical side members;
      (vi) removing the component parts from the base member;
      (vii) inserting the first horizontal support member back into the area defined by the front, rear, and first and second side vertical base members;
      (viii) inserting the locking tabs of each of the vertical wall members into the locking tab receiving openings in the first horizontal support member, and securing same therein;
      (ix) inserting the second horizontal support member into the base member, so that the periphery of the second horizontal support member lockingly contacts each of the vertical wall members so as to prevent movement of the locking tabs in the locking tab receiving openings;
      (x) placing the top member on the top peripheral edges of each of the vertical wall members utilizing the top locating tabs and complimentary top locating notches;
      (xi) inserting the first end of a locking device into a locking device receiving opening in the top member, and the second end of the locking device into a locking device receiving opening in one or more of the vertical wall members; and
      (xii) inserting the first end of a locking device in the locking device receiving opening in one or more vertical wall members, and the second end of the locking device into a locking device receiving opening in one or more adjacent vertical wall members.

12. A method of assembling a reusable container comprising:
   providing a base member comprising:
      front, rear and first and second side vertical base members mechanically fastened to one another to form a predetermined geometric shape, and having a predetermined height sufficient to contain complementarily shaped component parts therein; the component parts including:
      (i) a first horizontal support member having a peripheral area thereabout, a plurality of locking tab receiving openings being formed in the peripheral area of the first horizontal support surface;
      (ii) a front, a rear and first and second vertical wall members having a peripheral area thereabout, one or more locking tabs being formed in a bottom portion of the peripheral area of each of the front, rear and first and second vertical wall members, and having a plurality of locking device receiving openings formed in predetermined locations therein;
      (iii) a second horizontal support member having a peripheral area thereabout; the dimensions of such periphery being smaller by a predetermined amount than the dimensions of the first horizontal support member;
      (iv) a top member having a peripheral area thereabout, and having a plurality of locking device receiving openings formed in predetermined locations therein;
      (v) a plurality of locking devices having first and second ends capable of being inserted in the locking device receiving openings in the top member and vertical side members;
      (vi) removing the component parts from the base member;
      (vii) inserting the first horizontal support member back into the area defined by the front, rear, and first and second side vertical base members;

(viii) inserting the locking tabs of one or more of the vertical wall members into the locking tab receiving openings in the first horizontal support member, and securing same therein;

(ix) inserting the second horizontal support member into the base member, so that the periphery of the second horizontal support member lockingly contacts one or more of the vertical wall members so as to prevent movement of the locking tabs in the locking tab receiving openings;

(x) placing the top member on the top peripheral edges of each of the vertical wall members utilizing the top locating tabs and complimentary top locating notches;

(xi) inserting the first end of a locking device into a locking device receiving opening in the top member, and the second end of the locking device into a locking device receiving opening in one or more of the vertical wall members; and (xii) inserting the first end of a locking device in the locking device receiving opening in one or more vertical wall members, and the second end of the locking device into a locking device receiving opening in one or more adjacent vertical wall members.

13. The method of assembling a reusable container defined in claim 12, wherein the locking tab receiving openings have more than one shape.

14. The method of assembling a reusable container defined in claim 13, wherein one or more locking tab receiving openings are substantially T-shaped, and one or more locking tab receiving openings are substantially rectangular in shape.

15. The method of assembling a reusable container defined in claim 12, wherein the locking tabs have more than one shape.

16. The method of assembling a reusable container defined in claim 15, wherein one or more locking tabs are substantially T-shaped, and one or more locking tabs are substantially rectangular in shape.

17. The method of assembling a reusable container defined in claim 12, wherein at least the front vertical wall member has a substantially rectangular locking tab which is insertable into a substantially rectangularly shaped locking tab receiving opening in the first horizontal support member after the second horizontal support member has already been disposed over the first horizontal support member.

* * * * *